(12) United States Patent
Winter et al.

(10) Patent No.: US 7,731,886 B2
(45) Date of Patent: Jun. 8, 2010

(54) METHOD OF MANUFACTURING A FILTER CARTRIDGE

(75) Inventors: Josef Winter, Shailer Park (AU); Harold Thomas Krelle, Sunnybank Hills (AU)

(73) Assignee: Filter Technology Australia Pty Ltd., New South Wales (AU)

( * ) Notice: Subject to any disclaimer, the term of this patent is extended or adjusted under 35 U.S.C. 154(b) by 1264 days.

(21) Appl. No.: 10/969,948

(22) Filed: Oct. 22, 2004

(65) Prior Publication Data

US 2005/0108867 A1 May 26, 2005

Related U.S. Application Data

(62) Division of application No. 09/868,333, filed as application No. PCT/AU99/01121 on Dec. 17, 1999, now Pat. No. 7,066,338.

(30) Foreign Application Priority Data

Dec. 18, 1998 (AU) ........................................ PP7840

(51) Int. Cl.
 *B29C 45/44* (2006.01)
(52) U.S. Cl. ........................................ 264/318; 264/336
(58) Field of Classification Search ................ 264/318, 264/336; 425/DIG. 58; 249/59, 60
See application file for complete search history.

(56) References Cited

U.S. PATENT DOCUMENTS

| | | | |
|---|---|---|---|
| 2,759,610 A | 8/1956 | James | |
| 3,333,703 A | 8/1967 | Scavuzzo et al. | |
| 3,402,713 A * | 9/1968 | Senkowski et al. | 604/241 |
| 4,109,676 A | 8/1978 | Price | |
| 4,113,829 A * | 9/1978 | Bowker et al. | 264/295 |
| 4,454,036 A | 6/1984 | Suzuki | |
| 4,540,489 A | 9/1985 | Barnard | |
| 4,935,188 A * | 6/1990 | Sorensen | 264/328.7 |
| 4,960,557 A * | 10/1990 | Sorensen | 264/328.12 |
| 5,080,244 A | 1/1992 | Yoshino | |
| 5,171,430 A | 12/1992 | Beach et al. | |

(Continued)

FOREIGN PATENT DOCUMENTS

WO 97/19737 6/1997

OTHER PUBLICATIONS

Menges et al., How to Make Injection Molds, $3^{rd}$ edition, 2001, Hanser Publishers, pp. 446-449.*

(Continued)

*Primary Examiner*—Jill L Heitbrink
(74) *Attorney, Agent, or Firm*—Young & Thompson

(57) ABSTRACT

An injection moulding assembly includes a male moulding member surrounded by a female moulding member forming a void between them that upon injection of molten plastics into the mould a container can be formed. The moulding assembly includes a guide rod and ejection flange and a pair of ejection flange guide rods, an air vent valve and an injection passage. The male member includes in this embodiment eight grooves unevenly spaced so that the partially hardened container formed in the injection mould can be pushed from the mould using the ejection flange while the container is sufficiently green to enable the ribs formed in the grooves to move over the surface of the male mould during the ejection process.

9 Claims, 11 Drawing Sheets

U.S. PATENT DOCUMENTS 5,593,063 A     1/1997   Claydon et al.
5,660,784 A *   8/1997   Cruce et al. .............. 264/328.1
5,804,123 A *   9/1998   Klomhaus et al. ........... 264/318
5,916,435 A *   6/1999   Spearman et al. ........... 210/132
6,213,666 B1 *  4/2001   Lang et al. .................. 401/251
6,468,427 B1 * 10/2002   Frey ...................... 210/497.01

OTHER PUBLICATIONS

Rosato et al., Injection Molding Handbook, second edition, International Thomson Publishing, 1995, pp. 486-488,604-613.*
Plastics Engineering Handbook of the Society of Plastics Indrustry, Inc, $5^{th}$ edition, Berins editor, Kluwer Academic Publishers, 1991, pp. 326-327.*

* cited by examiner

METHOD OF MANUFACTURING A FILTER CARTRIDGE

This application is a division of application Ser. No. 09/868,333, filed on Jun. 18, 2001, application Ser. No. 09/868,333 is the national phase of PCT International Application No. PCT/AU99/01121 filed on Dec. 17, 1999 under 35 U.S.C. §371. The entire contents of each of the above-identified applications are hereby incorporated by reference.

FIELD OF THE INVENTION

This invention relates to filtration and in particular but not limited to filtration of engine, transmission and hydraulic oils, fuel and solvents.

BACKGROUND ART

Oil filtration involves the use of full flow filters that filter all oil on every pass through the filter and the use of by-pass oil filters in conjunction with the full flow filters. By-pass oil filters operate in parallel with the full flow filter and generally speaking have a greater filtration than the full flow filter.

Full flow elements filter all oil on every pass and work using an element operating like a series of small sieves, with tiny holes allowing oil to pass through, while filtering out particles too large to pass through the sieve-like element. However, the holes are not small enough to filter out many finer particles, and it is these particles that can cause significant engine wear over a period of time.

On the other hand a by-pass filter operates in parallel with the full flow filter and can be much finer to progressively remove finer contaminants not captured by the full flow filter. The use of a by-pass filter progressively filters all the oil, thus increasing the useful life of the oil and reducing engine wear.

Typical by-pass oil filters include pleated element by-pass elements. These filters employ a longitudinally pleated membrane that is prone to become clogged after just a few hours work. Many by-pass filters have a pressure release valve that opens when this occurs. Another type of by-pass filter is a multiple disc by-pass filter which lasts much longer than the pleated elements.

The most effective by-pass filters employ a roll of paper wound on a central core with the feedstock being forced edgewise through the roll of paper to progress longitudinally the full width of the paper media. The filtrate then flows to the central core where it exits the filter via a return pipe. The principle of operation of this type of filter is different to the sieve-like filter and the pleated filter in so far as the paper roll filter relies on oil passing between the layers of paper, instead of passing through a sieve-like element.

Early forms of paper roll filters employed a toilet roll fitted within a filter housing. Later more sophisticated forms employed a filter element comprising a disposable canister holding the paper roll.

Australian patent number 650176 describes a filter element of the cartridge type employing a filter housing with a filter element within the housing. The filter element employs a metal canister with a paper roll forced into the canister under pressure, the canister being open at one end, for entry of feedstock, with a base at the other end, the base having a central hole for the return pipe. A layer of gauze in the base of the canister allows the filtrate to flow across the base to the return pipe in the central core. The sides of the canister are ribbed to inhibit feed stock tracking down the sides of the canister. The canister also has three or four depressions circumferentially spaced depressions in the base to hold the gauze layer away from the base providing clear secondary flow passages below the gauze to improve flow of filtrate.

The paper is tightly wound providing a much finer effective filter than the pleated and disc type filters.

Nevertheless the metal canister has a number of disadvantages. The ribbed side wall is employed to inhibit tracking of feedstock down the side wall outside the filter media but limits the density of the media. While ribbing is effective to limit tracking the canister is prone to buckle under load while the paper is being pressed into the canister. This effectively limits the amount of sideways compression that can be applied to the paper roll to a maximum defined by the flex in the side walls of the can and the inherent flexing of the ribs as the paper is being pushed into position, the limit being canister failure.

The element construction of Australian patent number 650176 results in a five percent (5%) failure rate of canisters during insertion of the paper roll into the canisters. Also the canisters are prone to be crushed by oil pressure when in use particularly at cold start up when the oil is most viscous. Construction of canisters from thicker metal would make filters more expensive and the ribbing to prevent tracking more difficult to produce in a technical sense.

Since the metal canisters are disposable they must be designed for single use application at a reasonably economical cost. It would be desirable to provide an alternative that is competitively priced, improves filtration and is less likely to buckle under load.

As an alternative to metal canisters PCT/AU96/00762 describes a plastics filter canister suitable for repeated use to enable recycling of the canister. The canister is made sufficiently rigid such that the spent paper roll can be removed using a tool and a fresh roll inserted into the canister. Due to the construction of the metal canisters of patent number 650176 efforts to remove the spent rolls from the metal canisters would in most cases render the metal canisters unusable having been designed for use as a disposable element. The problem with the canister described in. PCT/AU96/00762 is that the design is not amenable to mass production using injection moulding techniques. In addition, the base of the canister was designed with closely spaced concentric rings in an effort to reproduce the effect of the secondary flow through passages utilized in the base of the metal canister while supporting the media. While this arrangement was effective in supporting the filter media and gauze the flow characteristics were less than desirable.

OUTLINE OF THE INVENTION

The present invention achieves its objectives to provide an improved disposable or reusable canister by providing a rigid plastics canister holding a roll of filter paper under higher sideways compression than known in the prior art while enabling manufacture of the filter canister as a one piece injection moulded canister.

In one aspect therefore the present invention resides in a method for construction of an internally ribbed injection moulded hollow tube section suitable for use in a filter element holding a paper roll filter media, the method comprising the steps of:

(i) providing a generally cylindrical male mould member having longitudinally spaced rib defining grooves;

(ii) providing a female mould member adapted to overlay the male mould member in closely spaced relation defining a tube shaped void between the mould members;

(iii) injecting moulding material into the void, said moulding material being selected to provide a substantially rigid tube when cured;

(iv) removing the female mould member from the male mould member while the tube is in a green state, the grooves in the male mould member retaining the tube in position on the male mould member; and (v) subsequently forcing the tube from the male mould member while the tube is still in a green state.

The term "green state" is used herein to mean a condition of hardening whereby the dimensions of the grooves and the degree of hardening of the tube is such that the moulded tube ribs can be pushed from the grooves in the male member without significant distortion of the tube compared to a higher degree of hardening whereby the grooves serve to retain the tube on the male member.

The timing of the release of the tube from the male member will depend upon the nature and characteristics of the plastics moulding material used.

It is desirable that the grooves are not uniformly spaced on the male member so that once the initial release of the tube from all the grooves at the first instance takes place as the tube is slid over the male member, the ribs do not all encounter grooves at the same time. Thus, due to the selected uneven spacing of the grooves, the force required to push the tube over the grooves is restricted such that as the tube is pushed off less than the full complement of ribs engage the grooves at any one time during the process whereby the tube is pushed from the male member.

The tube can be open ended or can have one end closed. The tube typically has open ends when it is intended to form an outer casing for a double ended filter such as a fuel filter.

Where the mould includes a void at the free end of the male member for forming a transverse base across one end of the tube, during production and while the moulding material covers the free end of the male member it is preferable to vent the inside of the base through the male member to avoid suction that may inhibit the pushing of the tube off the male member.

In another aspect the invention resides in a rigid injection moulded generally cylindrical canister, the canister having a side wall, the side wall having an outer surface and an inner surface, the canister being used as a filter element holding a paper roll as filter media, the canister having a thin side wall and there being spaced anti-tracking ribs projecting from the inner surface of the side wall and projecting a distance sufficient to enable the canister to be removed from a male mould member defining said ribs, the paper roll being of marginally greater diameter than the internal diameter of the canister, the canister being sufficiently rigid and the paper roll being sufficiently tightly wound that the paper roll when inserted into the canister using a press is substantially compressed to the internal dimensions of the canister without distortion of the canister.

Typically, the assembled filter element is employed in a standard filter housing where the external dimensions of the element is about 110 mm in diameter and 170 mm long, the applicant has found that using 17 gsm thick paper and paper a paper density above about 15 m/cm radial width reduces flow to undesirable levels whereas densities of about 13 m/cm radial width is optimum for maximising filtration but at the same time maintaining desirable flow rates, densities below about 11 m/cm radial width the roll tends to collapse within the canister base flow can become blocked and the anti-tracking ribs become ineffective. Although filters do work for a short time at these lower densities effective and reliable filtration generally occurs above about 12 m/radial cm. The present invention in this preferred form enables just the right amount of paper, matched to the rib size and most desirable compression suited to injection moulding and reliable in operation when compared to the prior art.

Preferably the side walls of the canister include marginal flaring of at least one end of the canister so that the side wall of the canister is medially biased of the order of 0.5 to 1 millimeter so that the side wall of the canister is biased inwardly to resist distortion of the side wall and enhance compression of the paper roll inside the canister. Typically the flared end is the open end at which the paper roll is pushed into the canister.

Preferably the ribs project 1 millimeter to 2 millimeters from the inner surface of the canister with 1.5 millimeters being optimum. Where the ribs are evenly spaced it is preferable that they be at the shallower end of the range of projection, the inner wall may have a slight taper on the inner surface to further assist release from the male mould. However, the paper must be more tightly wound and placed under higher compression to achieve the same filter efficiency and anti-tracking when compared to a cylindrical shape where the inner diameter is uniform or carries the medially biased inward shape.

The canister preferably includes a marginal taper on the inner surface at the open end to act as a lead in for the paper roll, the objective being to minimise the "give" in the canister and to maximise the sideways compression applied to the shallow anti-tracking ribs.

Preferably where the canister has a base, the base includes external radial strengthening ribs and again is biased inwardly. The base is typically inwardly dished by up to 2 millimeters at the centre relative to the edges in order to provide a bias against the loading of the paper roll as the paper roll is being pressed home into the canister.

The base preferably has an inner surface with radially extending flow passages separated by lands, the lands defining supporting surfaces for a gauze to evenly distribute and support the paper roll media across the base of the canister and to provide secondary flow passages across the base of the canister below the gauze.

BRIEF DESCRIPTION OF THE DRAWINGS

In order that the present invention can be more readily understood and be put into practical effect reference will now be made to the accompanying drawings which illustrate preferred embodiments of the invention and wherein.

METHOD OF PERFORMANCE

Figure 1:
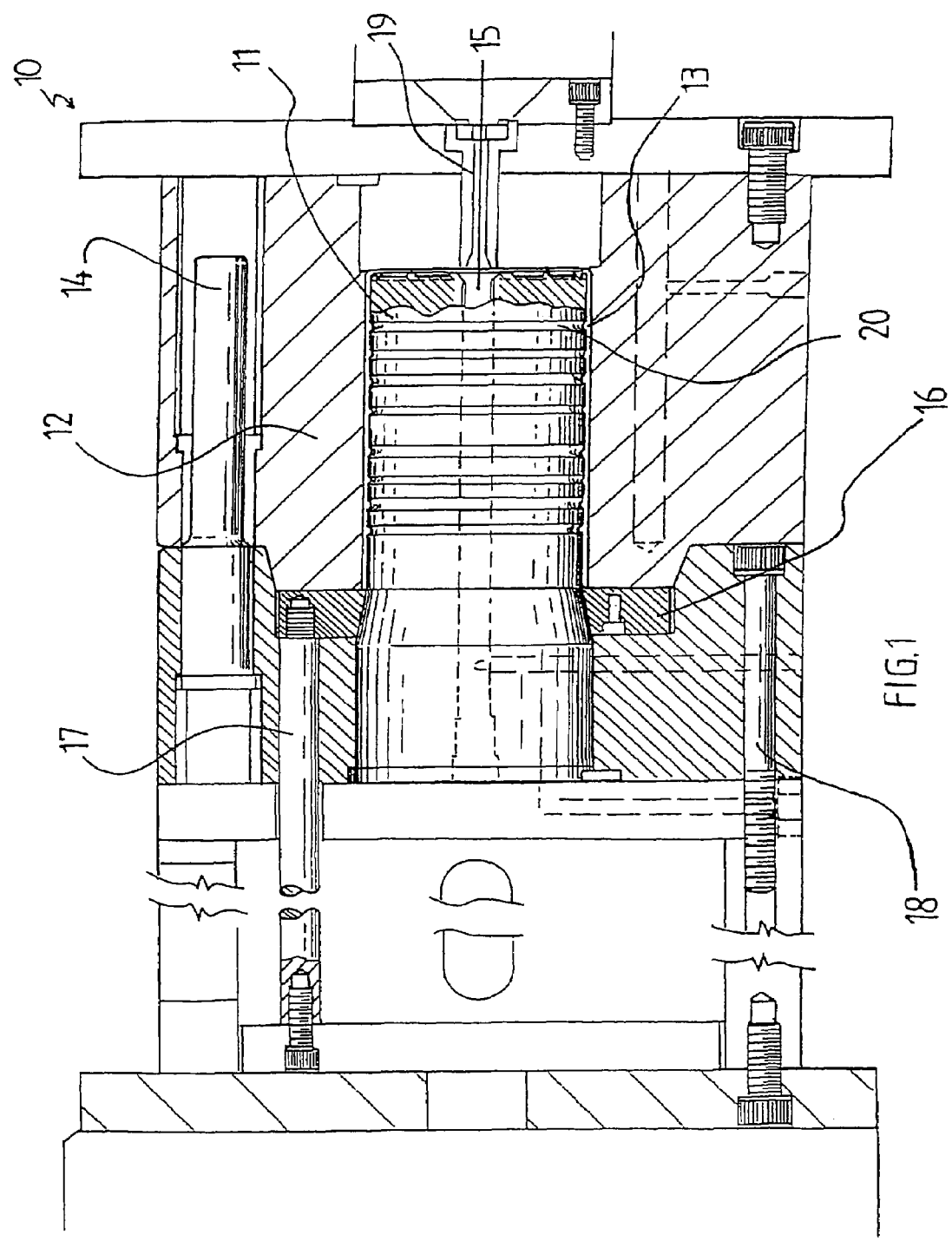
FIG. 1 is a drawing illustrating an injection moulding apparatus for implementing the method described.

Referring to the drawings and initially to FIG. 1 there is illustrated an injection moulding assembly 10 comprising a male moulding member 11 surrounded by a female moulding member 12 forming a void 13 between them that upon injection of molten plastics into the mould a container can be formed. The moulding assembly includes a guide rod 14 and ejection flange 16 and a pair of ejection flange guide rods 17 and 18, an air vent valve 15 and an injection passage 19. The male member 11 includes in this embodiment eight grooves 20 unevenly spaced so that the partially hardened container formed in the injection mould can be pushed from the mould using the ejection flange 16 while the container is sufficiently green to enable the ribs formed in the grooves 20 to move over the surface of the male mould 11 during the ejection process.

Figure 2:
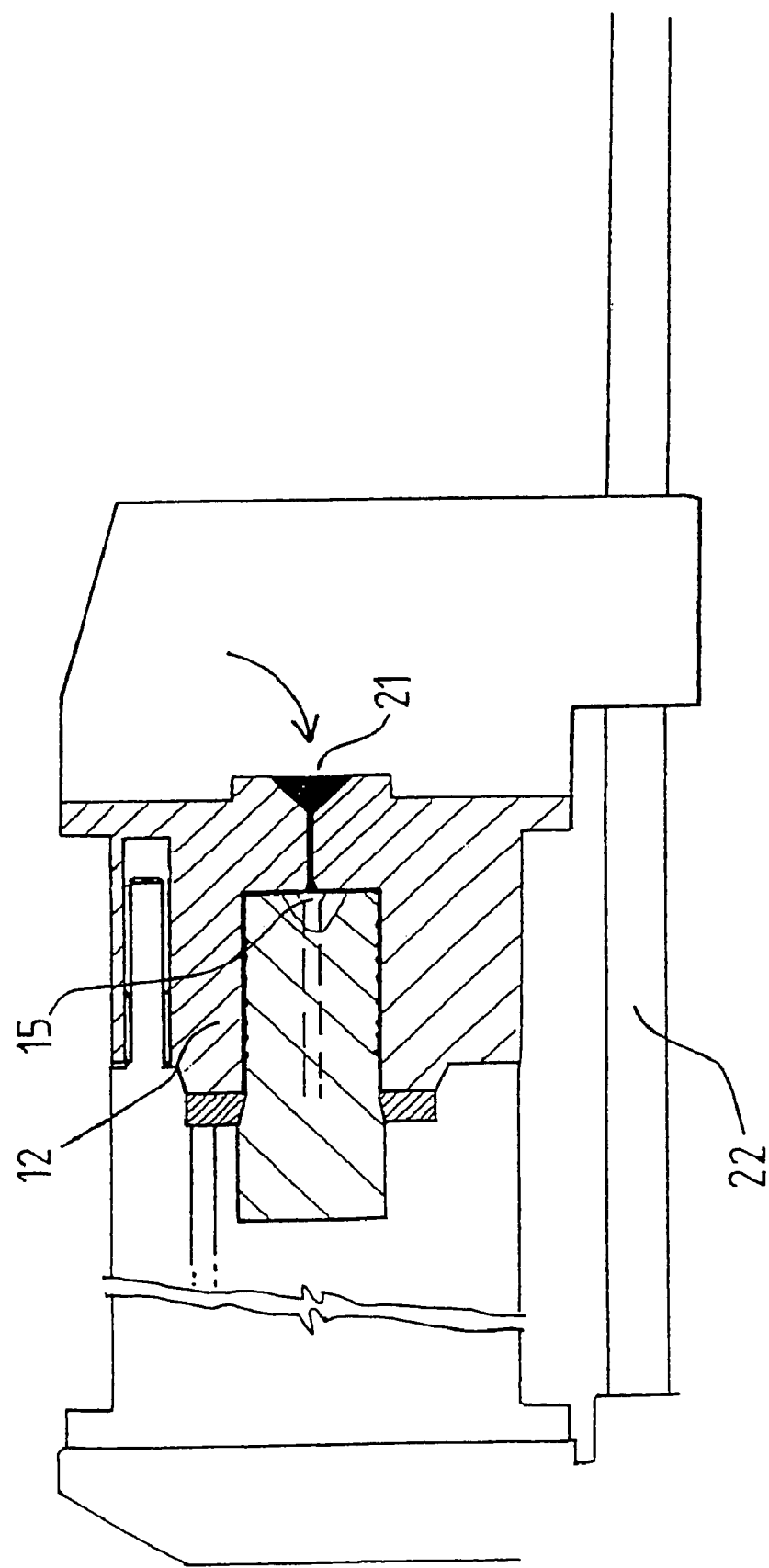
FIGS. 2, 3 and 4 are schematic drawings illustrating the moulding process utilising the apparatus of FIG. 1.
Figure 3:
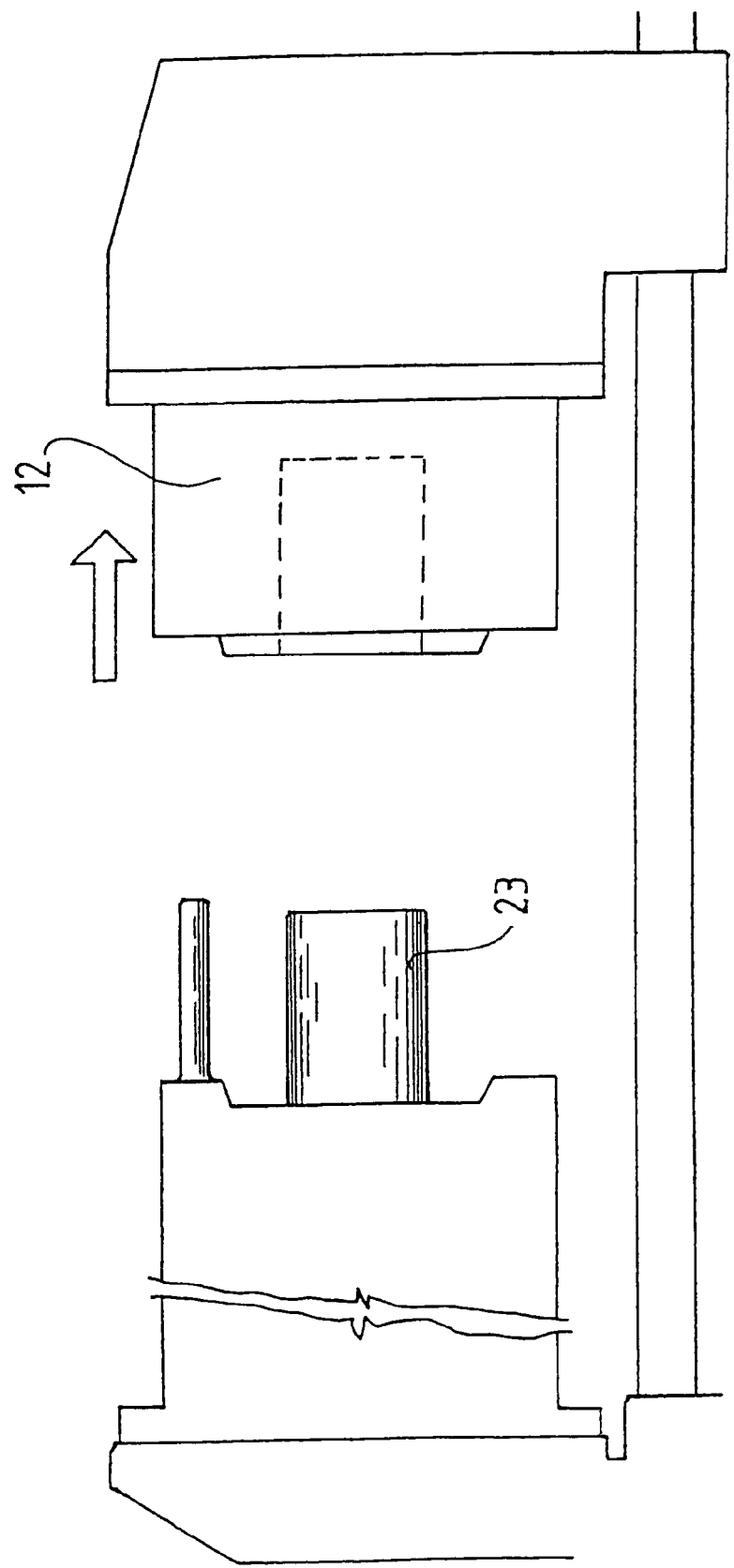
Figure 4:
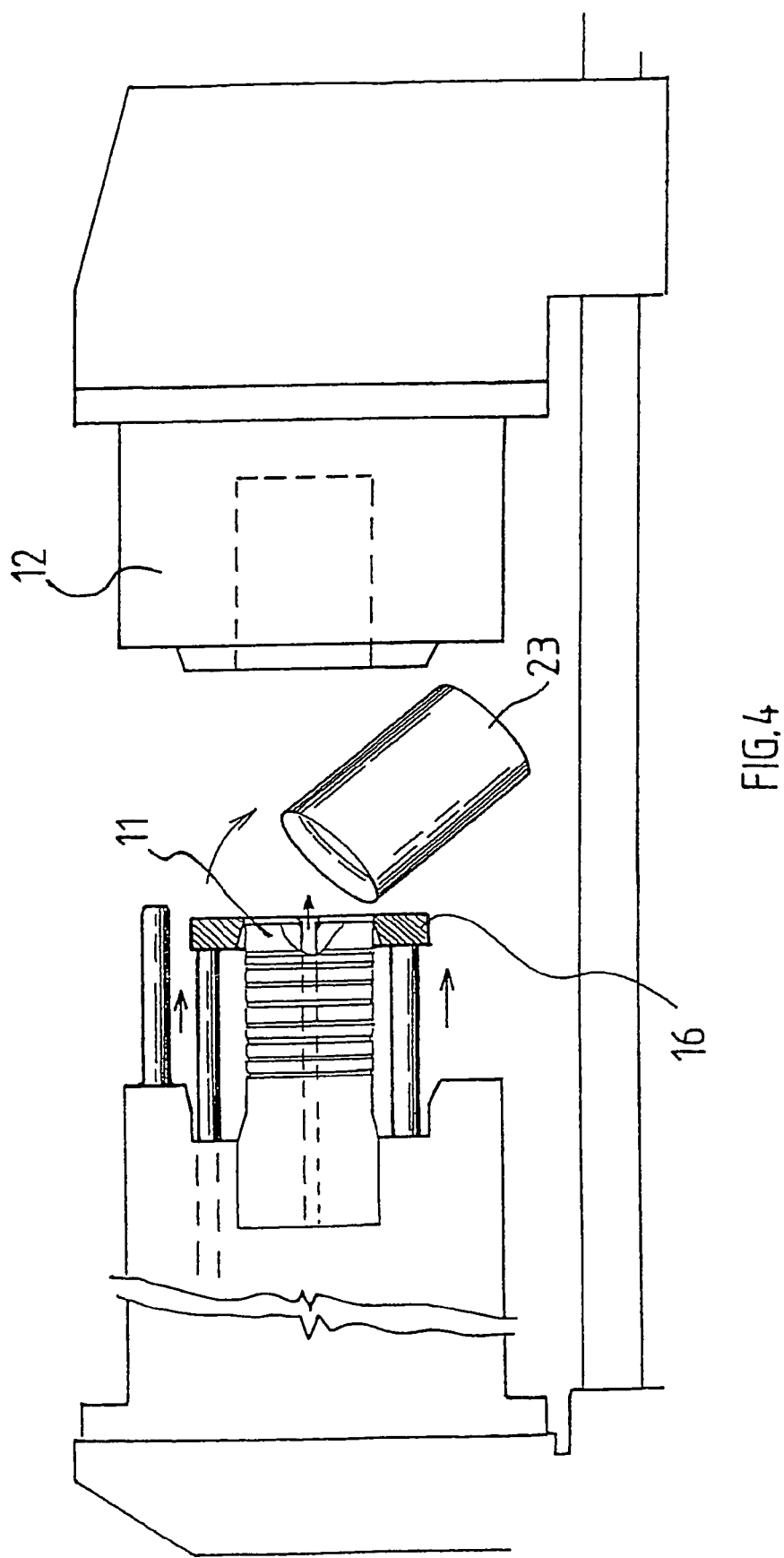
Figure 5:
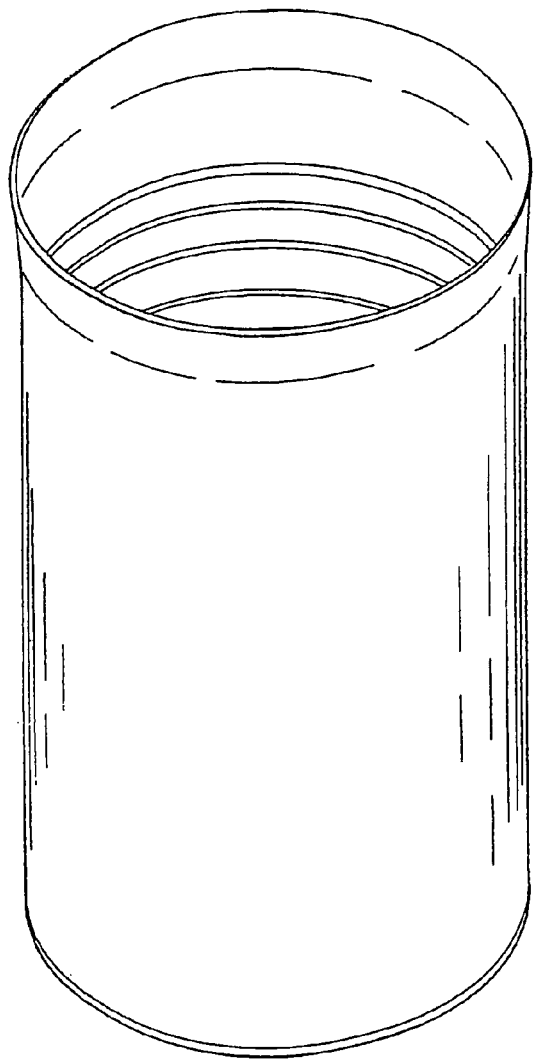
FIGS. 5 and 6 are opposite perspective views.
Figure 6:
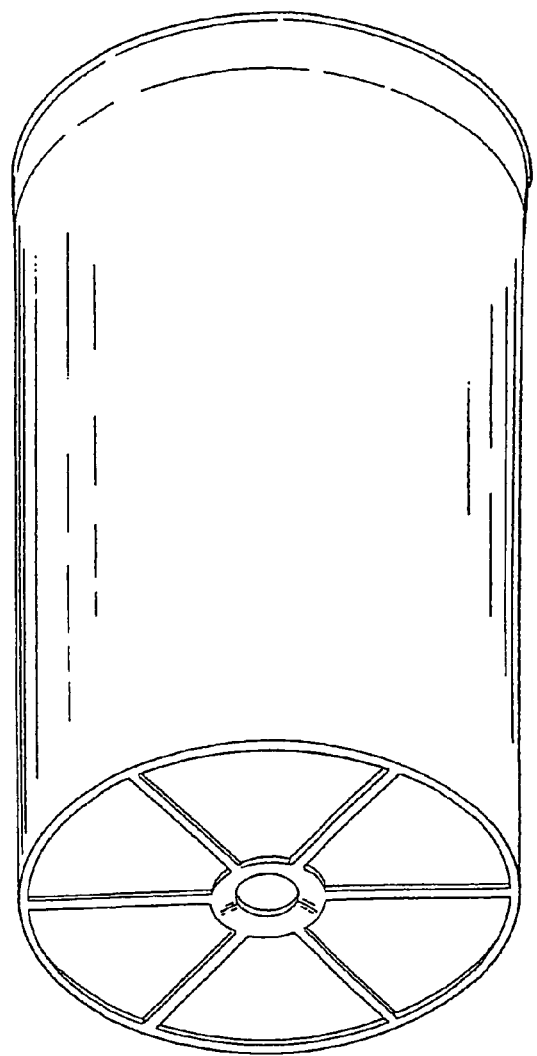
Figure 7:
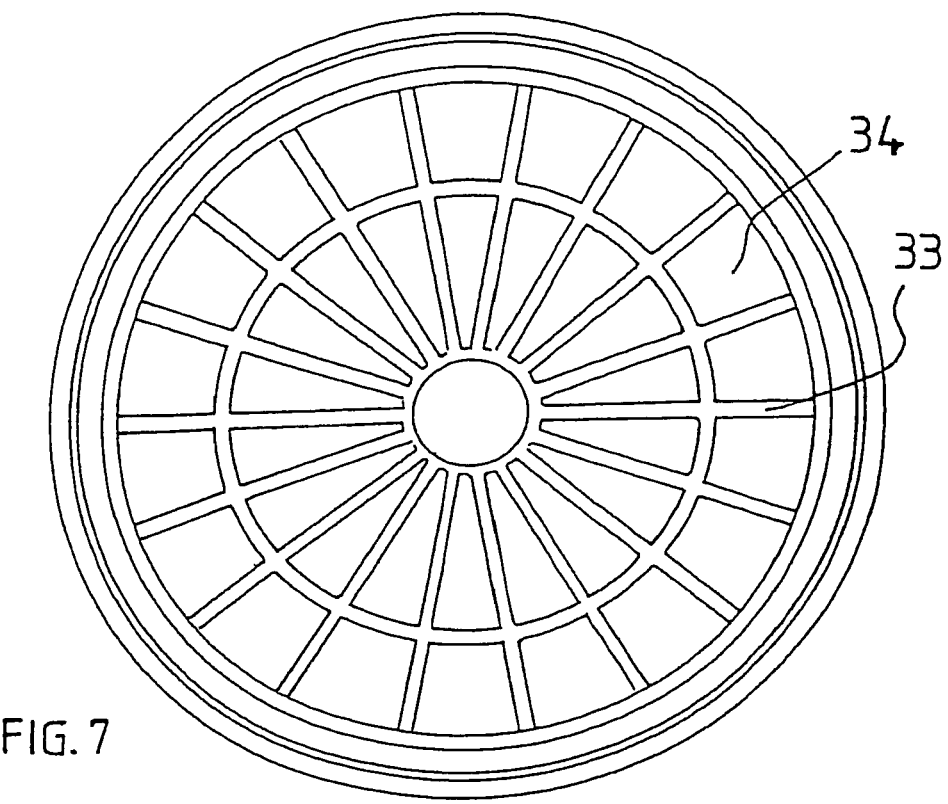
FIG. 7 is a top view.
Figure 8:
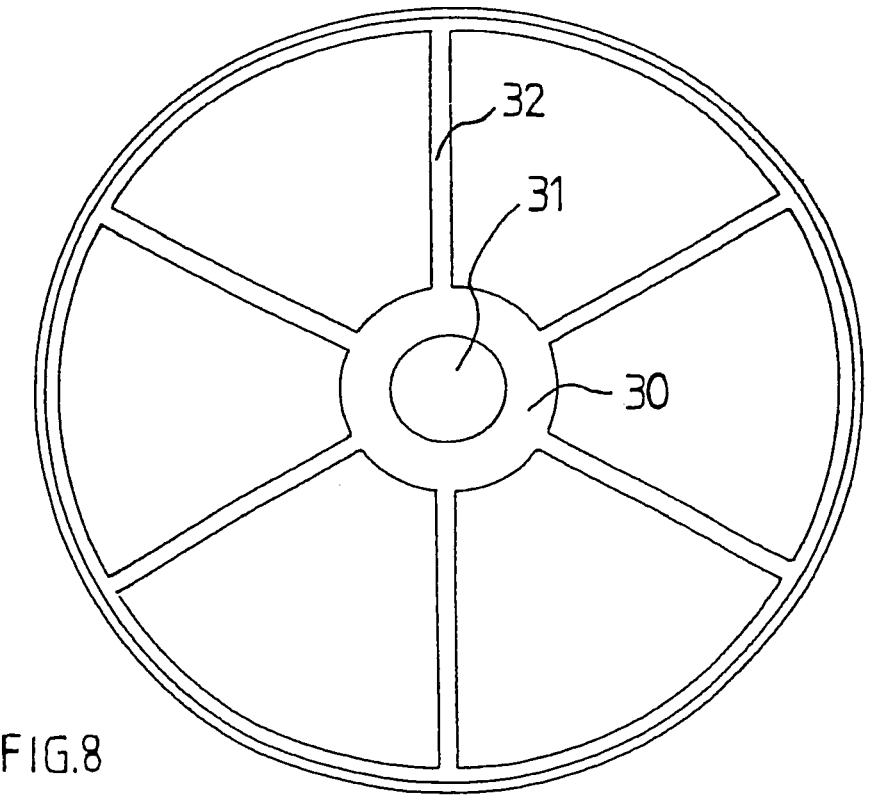
FIG. 8 is a bottom view.
Figure 9:
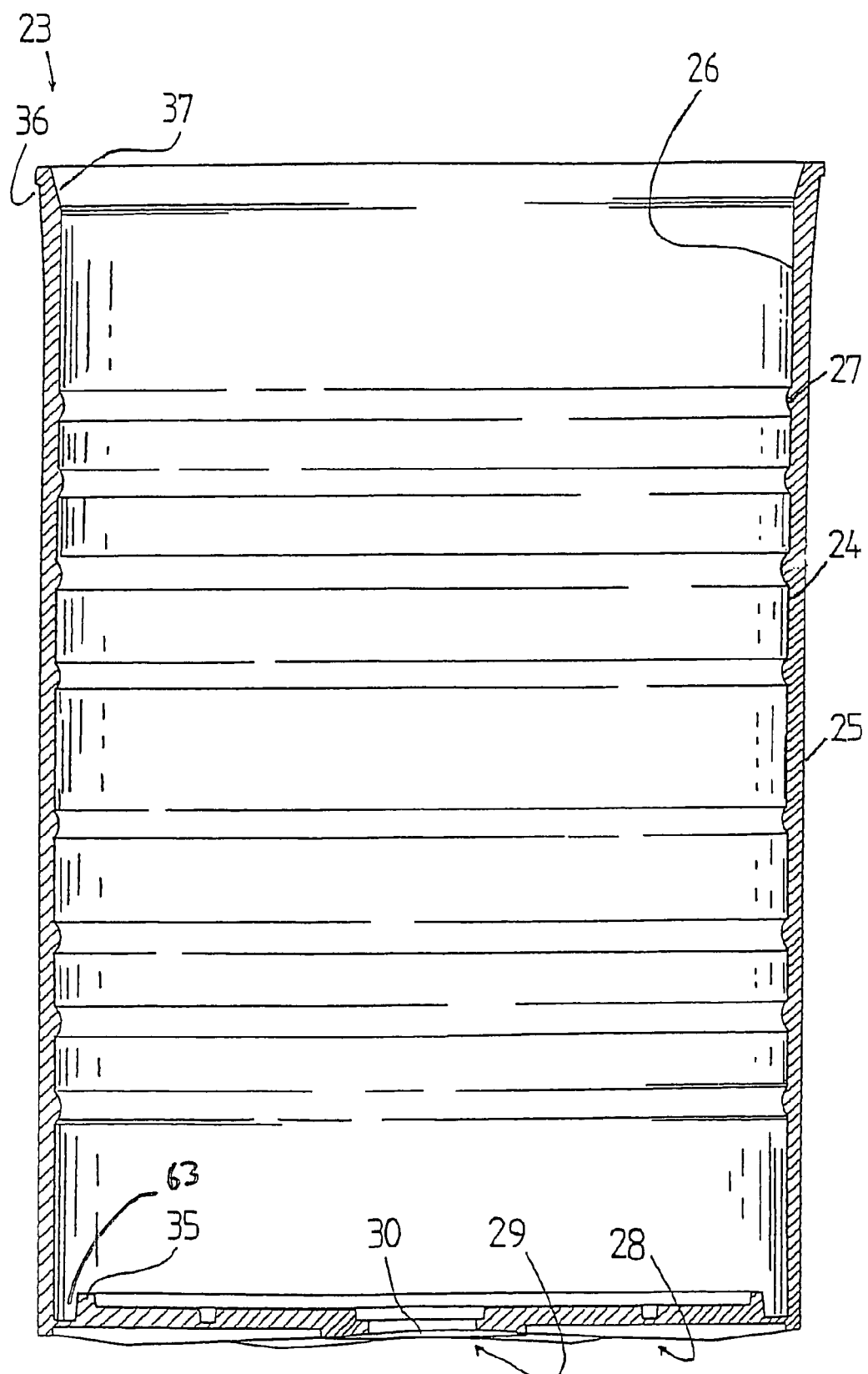
FIG. 9 is a cross-section all illustrating a canister made using the apparatus of FIG. 1.

FIGS. 2, 3 and 4 illustrate the three stages of production of a container using the injecting moulding assembly of FIG. 1. FIG. 2 represents the first stage in the process whereby liquid plastic is forced in under pressure and is represented as the black section at 21. An air vent valve at 15 is closed and the female moulding member 12 is in the closed position along the main guide rails 22.

In stage 2 represented by FIG. 3 the female mould member 12 has been withdrawn while the container 23 remains on the male moulding member. The container 23 is still green at this stage. In the third stage of the process the ejection flange 16 is driven along the surface of the male mould member and the air vent valving is opened and the container 23 is pushed off the male moulding member 11 as illustrated in FIG. 4.

A typical container formed using the apparatus of FIG. 1 is illustrated in FIGS. 5 to 9. The container is a generally cylindrical canister having a side wall 24, the side wall having an outer surface 25 and an inner surface 26, the canister being used as a filter element holding a paper roll as filter media, the canister has a thin side wall and includes spaced anti-tracking ribs 27 that project in this case 1.5 millimeters into the interior of the container. The base 28 is inwardly dished at 29 and also includes a curved seat 30 for a sealing washer, a single aperture 31 being provided for a return tube for returning the filtrate from the filter to the main oil or fuel circuit. The base is externally ribbed with strengthening ribs 32 while the interior of the base includes radial flow passages 33 separated by lands 34. As can be seen there are in this embodiment 18 flow passages 33 and an annular projection 35. The annular projection 35 also serves an anti-tracking purpose in so far as any small amounts of oil that begin to track down the sides of the container become trapped in the annular channel 63 around the base 28 of the canister. The container 23 includes a flared marginal edge region at 36 and an outward chamfer at 37 which operates as a lead in for the paper roll into the canister 23.

Figure 10:
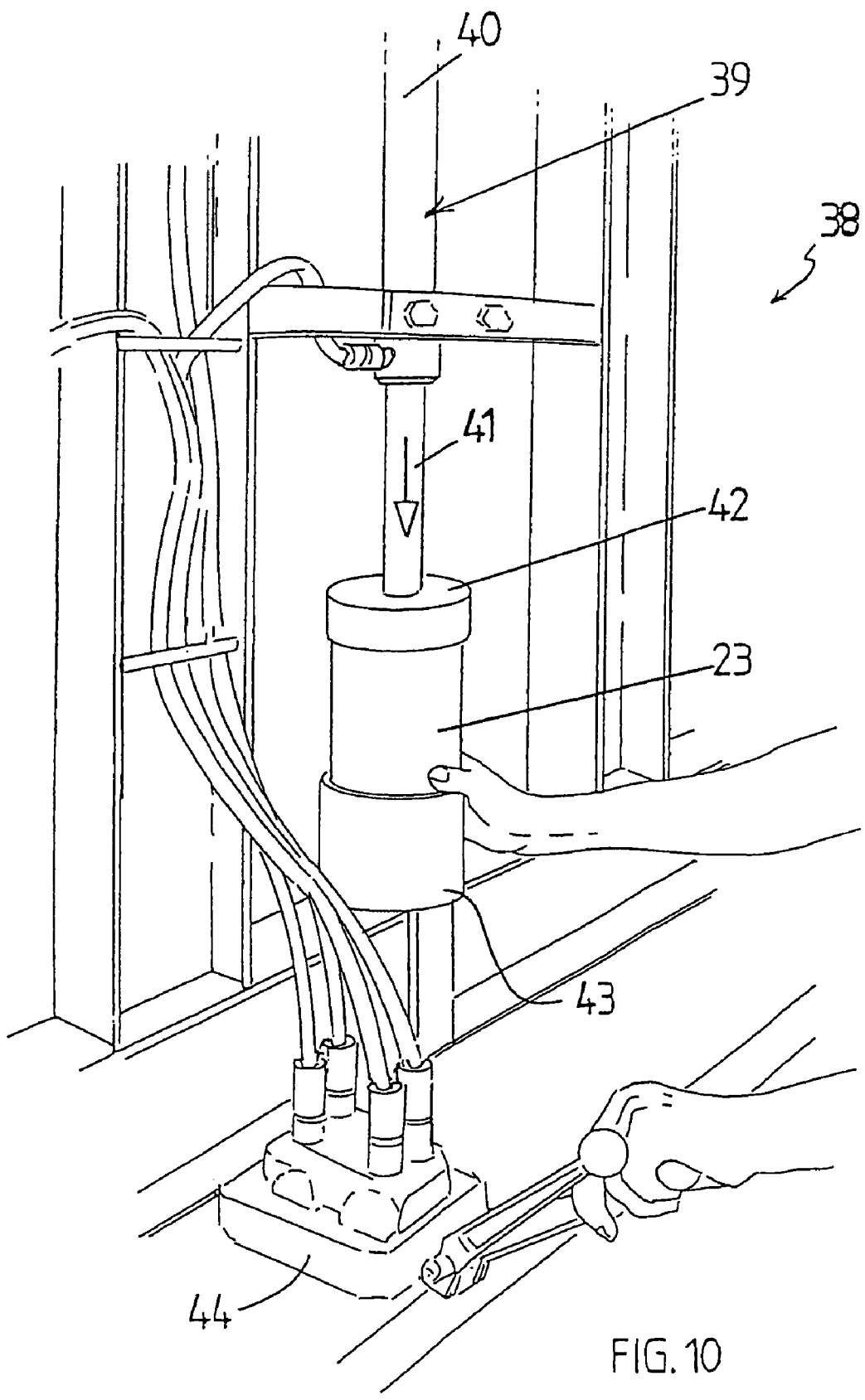
FIG. 10 is a perspective drawing illustrating a hydraulic press used to push a paper roll into the canister of FIGS. 5 to 9.

FIG. 10 illustrates the operation of a press 38 employing a hydraulic ram 39 having a cylinder assembly 40 with a piston rod 41 and a base platen 43 with a control valve 44.

Figure 11:
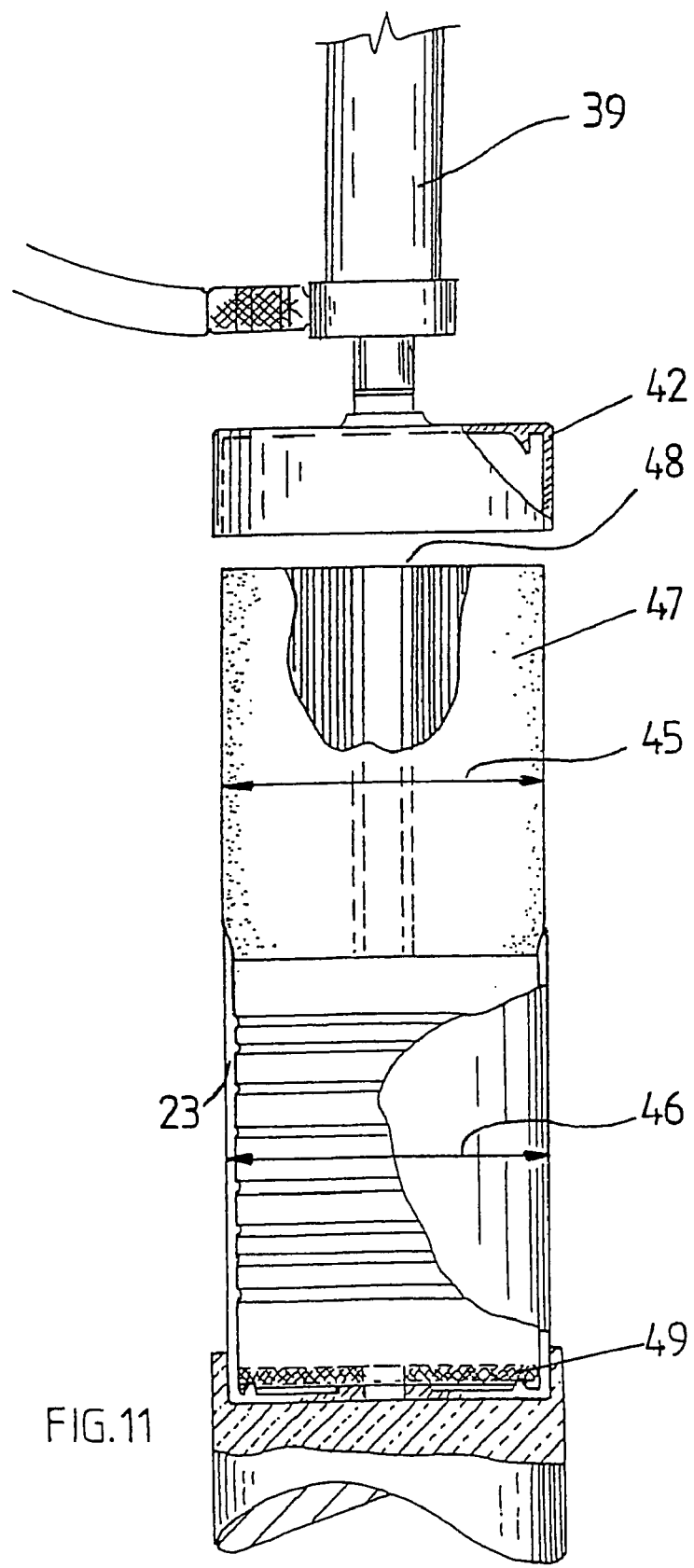
FIG. 11 is a schematic drawing illustrating operation of the press and the assembly of an oil filter element.
Figure 12:
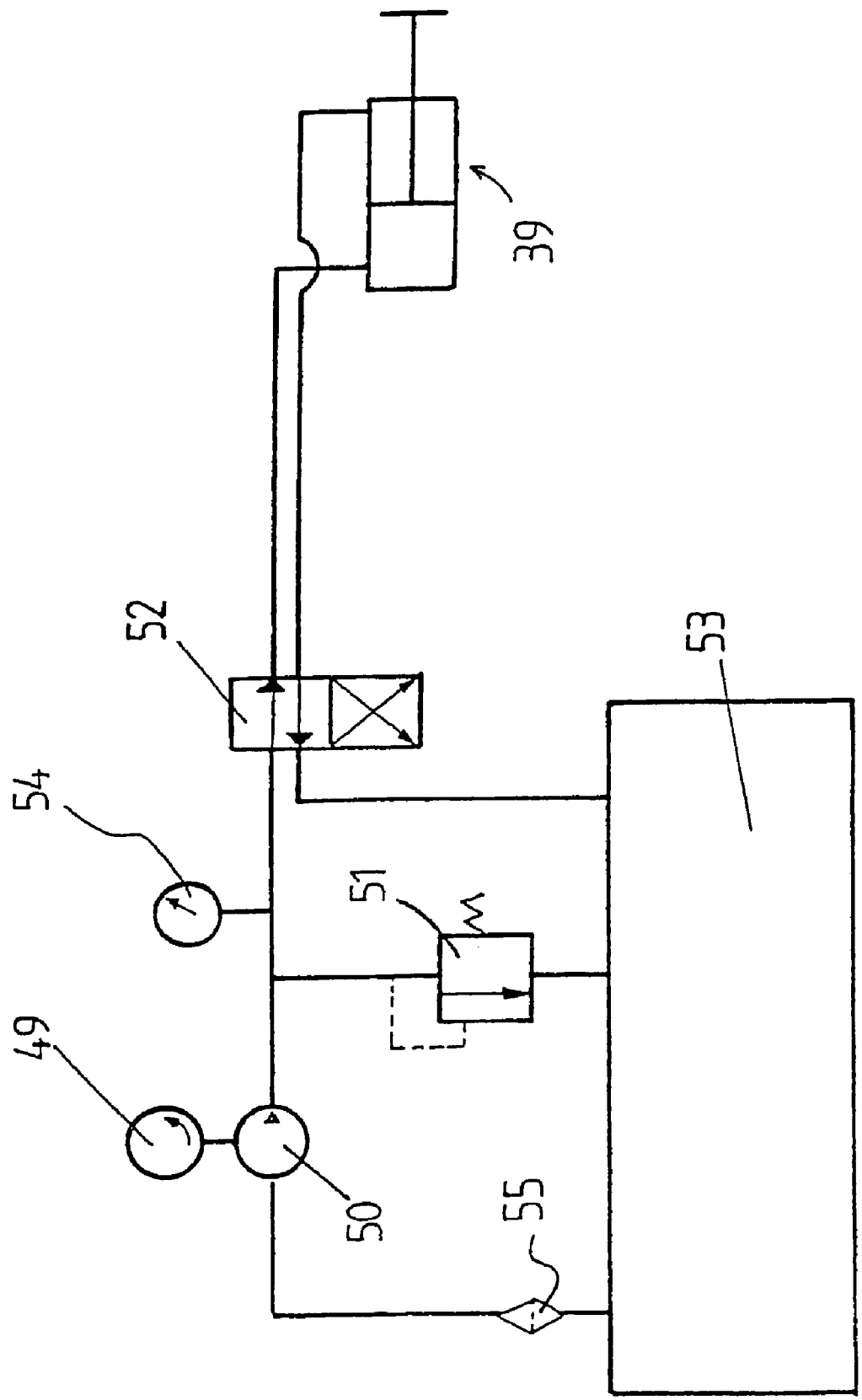
FIG. 12 is a schematic drawing of the hydraulic circuit for the press.
Figure 13:
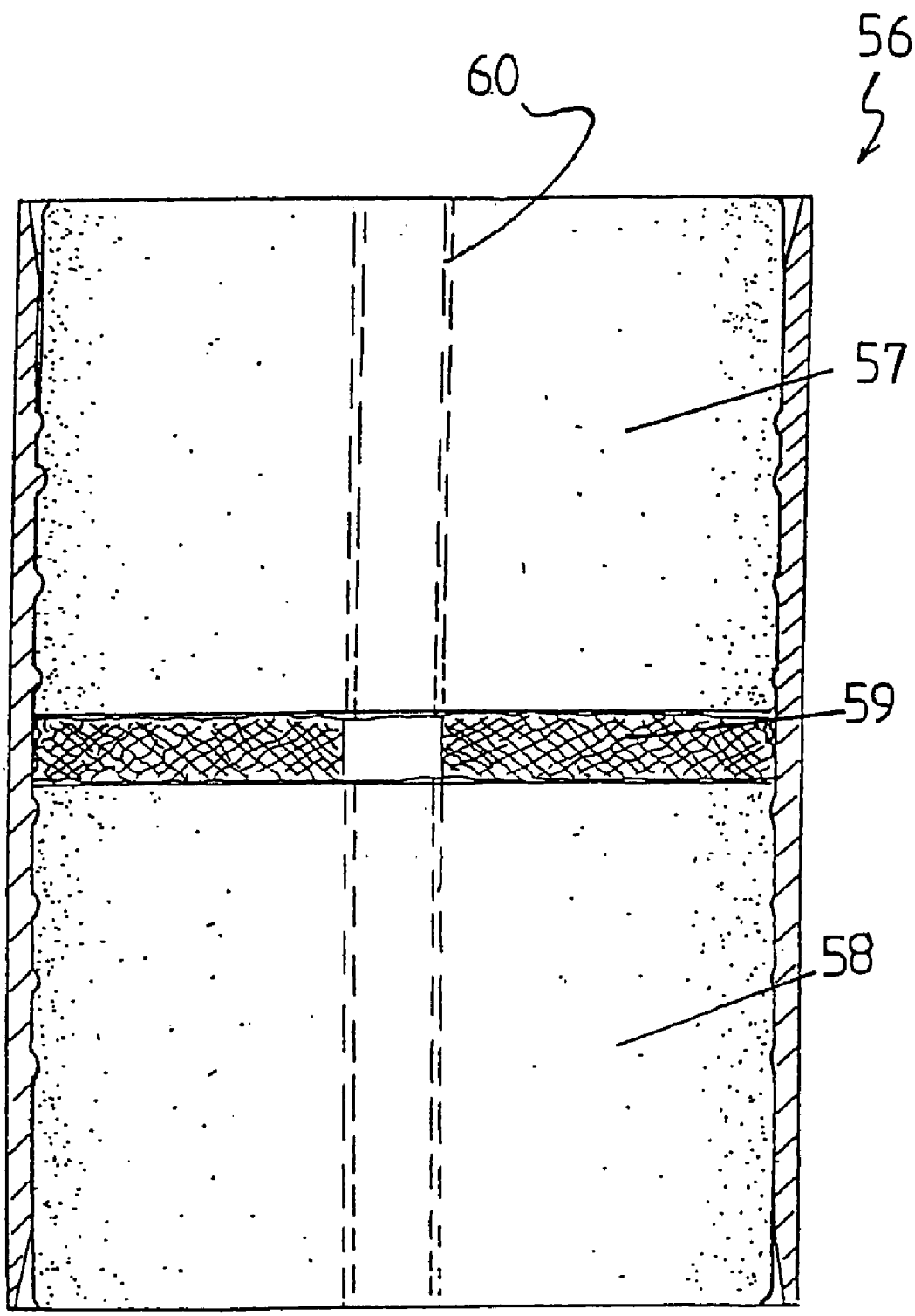
FIG. 13 is a section through a fuel filter element.

Assembly of a filter element is illustrated in FIG. 11. The diameters illustrated with the arrows 45 and 46 are approximately the same with the paper roll 47 comprising approximately 43 meters of paper wound into a tight 110 millimeter to 114 millimeter diameter roll on a cardboard core 48.

A layer of gauze 49 is placed in the base of the canister 23, the paper is initially pushed into position by hand as illustrated in FIG. 10 and then the guiding platen 42 is placed down onto the paper roll, activation of the hydraulic cylinder assembly causes the paper roll to be pushed into the canister 23.

The press used to force the paper roll into the canister in one typical embodiment is a 50 millimeter diameter hydraulic cylinder assembly 39. A one horse power single phase electric motor drives a 20 liter per minute gear pump 50. The cylinder operating pressure is 70 to 80 pounds per square inch which is achieved through an in-built adjustable relief valve 51. The relief valve is situated at the directional spool valve that the operator uses to operate the cylinder 52.

Other elements illustrated in the hydraulic circuit is the hydraulic reservoir 53 and a pressure valve 54 and a filter 55.

The last drawing illustrates application of the present invention to a fuel filter element 56 which can be made using the apparatus of FIG. 1 simply by adjusting the thickness of the base to be very thin so that the base can be removed making an open ended tube. Fuel to be filtered flows into the tube from both ends. Two half size paper rolls 57, 58 are inserted with a return flow path provided by an intermediate gauze 59. A return tube 60 is located in the central core as in the previous embodiment.

Whilst the above has been given by way of illustrative example of the present invention many variations and modifications thereto will be apparent to those skilled in the art without departing from the broad ambit and scope of the invention as herein set out in the appended claims.

What is claimed:

1. A method of constructing an internally ribbed injection molded hollow tube for a filter element, the method comprising steps of:
    providing a generally cylindrical male mold member having longitudinally spaced ribs defining grooves and a free end;
    providing a female mold member adapted to overlay the male mould member in closely spaced relation and define a tube shaped void between the mold members;
    injecting molding material into the void, said molding material providing a solid-walled substantially rigid tube when cured;
    removing the female mold member from the male mold member while the tube is in a green state, the grooves in the male mould member retaining the tube in position on the male mould member; and
    subsequently forcing the tube from the male mold member while the tube is still in a green state to form an internally ribbed injection molded solid-walled hollow tube having an open end,
    wherein the grooves are not uniformly spaced on the male mold member and further comprising the step of progressively sliding the tube off the male mold member, so that once the initial release of the tube from all of the grooves takes place, ribs formed in the grooves do not all encounter grooves at the same time.

2. The method according to claim 1, wherein the tube shaped void includes a void forming a transverse base across one end of the tube at the free end of the male mold member, and further comprising the step of opening valving to vent the inside of the base through the male mold member to avoid suction that may inhibit pushing of the tube off the male mold member.

3. The method according to claim 2, wherein the base is inwardly biased.

4. The method according to claim 2, wherein the base is inwardly dished at a center thereof relative to edges of the base in order to provide a bias, a paper roll is being pressed into the hollow tube.

5. The method according to claim 2, wherein the base has an inner surface with radially extending flow passages separated by lands, and further comprising the step of inserting a paper roll media into the hollow tube, the lands defining a supporting surface to evenly distribute and support the paper roll media across the base of the hollow tube to provide secondary flow passages across the base of the hollow tube.

6. The method according to claim 1, further comprising the step of inserting a filter element holding a paper roll as filter media into the open end of the hollow tube using a press, the paper roll being of marginally greater diameter than the internal diameter of the hollow tube and the hollow tube being sufficiently rigid and the paper roll being sufficiently tightly wound that the paper roll is substantially compressed to the internal dimension of the hollow tube without distortion of the hollow tube.

7. The method according to claim 1, wherein ribs formed in the grooves project at 1 mm to 2 mm from an inner surface of the hollow tube.

8. The method according to claim 7, wherein the ribs project about 1.5 mm from the inner surface of the hollow tube.

9. The method according to claim 1, wherein the hollow tube includes a marginal taper on an inner surface thereof, at the open end to act as a lead-in for a paper roll.

\* \* \* \* \*